(12) United States Patent
Oldham

(10) Patent No.: US 6,179,532 B1
(45) Date of Patent: Jan. 30, 2001

(54) FLEXIBLE DEBURRING TOOL

(76) Inventor: Steven V. Oldham, 15837 W. Duane Ln., Sun City West, AZ (US) 85375

(*) Notice: Under 35 U.S.C. 154(b), the term of this patent shall be extended for 0 days.

(21) Appl. No.: 09/290,329

(22) Filed: Apr. 12, 1999

(51) Int. Cl.[7] .................................................. B23C 1/20
(52) U.S. Cl. ........................ 409/132; 81/64; 408/127; 408/238; 409/138
(58) Field of Search .................... 409/132, 138, 409/140; 408/127, 199, 227, 238; 81/64

(56) References Cited

U.S. PATENT DOCUMENTS

| | | | |
|---|---|---|---|
| 519,354 | * | 5/1894 | Sheppard . |
| 1,454,789 | * | 5/1923 | Rentchler . |
| 1,507,990 | * | 9/1924 | Donaldson . |
| 2,679,778 | * | 6/1954 | Krafft . |
| 2,796,101 | * | 6/1957 | Hasemann et al. . |
| 2,814,322 | * | 11/1957 | Kupfrian . |
| 2,951,425 | * | 9/1960 | Eger ............................ 409/138 |
| 3,585,885 | * | 6/1971 | Carr ........................... 81/177 F |
| 3,788,168 | * | 1/1974 | Steinmann ......................... 81/3 R |
| 4,483,562 | * | 11/1984 | Schoolman ....................... 294/19 R |
| 4,634,322 | * | 1/1987 | Walker ............................ 409/138 |
| 5,066,174 | * | 11/1991 | Smith ............................. 408/202 |
| 5,271,135 | * | 12/1993 | Shifferly ......................... 408/238 |
| 5,455,997 | * | 10/1995 | Nasiell ............................. 29/456 |
| 5,464,407 | * | 11/1995 | McGuire ........................... 606/86 |
| 5,464,421 | * | 11/1995 | Wortrich .......................... 606/213 |
| 5,505,571 | * | 4/1996 | Jakob ............................. 408/199 |
| 5,572,913 | * | 11/1996 | Nasiell ........................... 81/177.6 |
| 5,597,273 | * | 1/1997 | Hirsch ............................ 408/199 |

* cited by examiner

*Primary Examiner*—Daniel W. Howell
(74) *Attorney, Agent, or Firm*—Ellis, Venable & Busam LLP

(57) ABSTRACT

A flexible deburring tool for removing burrs from a metal component made of unitary construction having a handle and a tool head with a flexible shaft extending between them that allows the tool head to be positioned in hard to reach or tight fitting situations. The tool head is provided with a recess to receive a tool bit such as a deburring bit. The shaft is narrower than the handle and allows a range of flexation greater than 90 degrees.

7 Claims, 2 Drawing Sheets

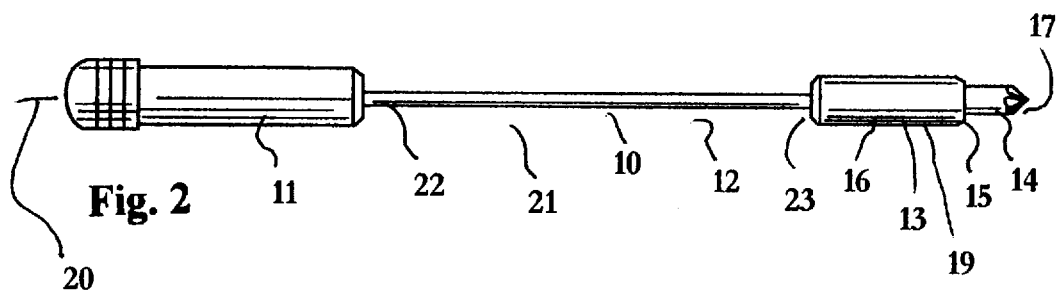
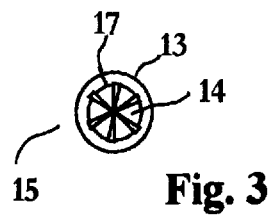
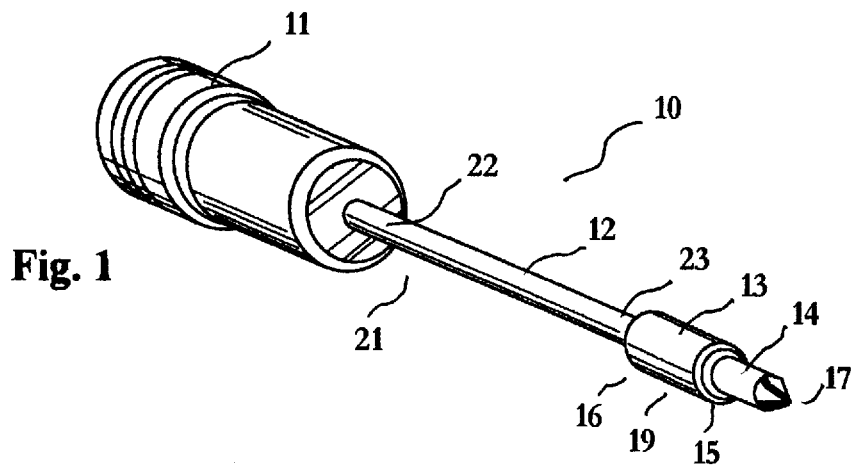

FLEXIBLE DEBURRING TOOL

FIELD OF THE INVENTION

The present invention relates to the field of hand held tools and more particularly to hand held deburring devices having a deburring bit mounted to a flexible shaft.

BACKGROUND

Manufacturing processes that produce metal components commonly leave burrs on various surfaces and edges of the metal component. Burrs are a protruding, ragged metal edge raised on the surface of the metal component. Drilling, boring, and cutting are common manufacturing processes that create burrs. It is highly desirable to remove the burrs from the metal components to enable them to fit and function correctly. Additionally, the visual appearance of the manufactured components is improved by removing any burrs.

Devices and processes to finish metal components by removing the burrs are well known and exist in many varieties. Barrel finishing or tumbling is one method of deburring components. Components to be finished are placed in a vibrating or rotating drum along with an abrasive medium. Typically, this abrasive medium consists of water or oil mixed with a chemical detergent. As the barrel oscillates, the abrasive medium grinds the unwanted burrs away.

Abrasive media flow deburring machines are used to deburr internal surfaces of manufactured components. The component is held in a fixed position within the machine. An abrasive medium is forced though the component, thereby deburring the component's internal surfaces.

These two processes outlined above are effective for deburring large numbers of parts in an industrial manufacturing process prior to assembly. Small tools and devices for deburring individual components by hand are also well known and exist in many varieties. A motorized tool having an aluminum oxide or hardened steel grinding bit is frequently used as a handheld deburring tool. Alternatively, conventional files are commonly used to deburr components. These deburring tools are rigid implements. The construction and assembly of complicated mechanisms presents serious problems in the use of the currently available deburring tools owing to the narrow and convoluted passages often available for these rigid deburring tools to reach the burrs.

In the present state of the art, it is not possible to deform the configuration of the existing rigid deburring tools in order to allow the device to position and operate the deburring bit in difficult to reach locations on a complex component. It is therefore desirable to have a handheld deburring tool that is can reach and function in the difficult to reach places and deburr the component.

Handheld tools that are provided with flexible shafts are well known and exist in many varieties. Nasiell, U.S. Pat. No. 5,572,913 discloses a flexible handheld tool that is designed to grasp nuts and place and attach them in inconvenient positions. The nuts are grasped by the end of a flexible shaft that is secured to a handle. A handheld surgical implement is disclosed in Wortrich, U.S. Pat. No. 5,464,421. This patent teaches a surgical implement that is provided with a flexible shaft attached to a handle portion. The flexible shaft holds and positions "thumb tacks" during surgery. Donaldson, U.S. Pat. No. 1,507,990, discloses a screwdriver that is provided with a flexible shaft. The flexible shaft is constructed from an outer shaft, or sleeve, of a helically wound strip of metal. The inner shaft, or drive shaft, is constructed from a tightly wound helical coil. Thus the drive shaft is able to rotate independently within the outer protective sleeve. A flexible screwdriver that uses a series of links to provide flexibility along a single plane is disclosed in Rentchler, U.S. Pat. No. 1,454,789.

The present state of the art does not address the problem of how to place a deburring bit in a difficult to reach position and deburr the component. While the use of flexible shafts for various handheld tools is well known and exists in many varieties, the present state of the art does not teach the use of a flexible shaft to position and operate the deburring bit in difficult to reach positions on complex components.

SUMMARY OF THE INVENTION

In accordance with the invention claimed, a novel handheld tool provided with a deburring bit is disclosed that is useful for deburring metal parts.

The handheld tool according to the present invention is of substantially unitary construction and made predominantly from plastic. The handheld tool is formed to have a handle and a tool head. Extending between the handle and the tool head is a flexible shaft that allows the tool head to be used in hard to reach or tight fitting situations. The tool head is provided with an opening to receive a metal tool bit. The preferred tool bit is a deburring bit. The shaft is narrower than the handle and allows a range of flexation greater than 90 degrees.

There are two disclosed embodiments for securing the deburring bit to the tool head. In one embodiment, the deburring bit is permanently secured to the flexible shaft by conventional means such as press fit or adhesive cement. In the other embodiment, the deburring bit is not permanently attached to permit the removal and interhchanging of the deburring bit with other tool bits. It is desirable to interchange deburring bits when the bit in use becomes dull and worn from numerous deburring processes. In addition, the ability to interchange bits enables a single handle, flexible shaft, and tool head assembly to support deburring bits of various sizes and configurations as well as other mechanical bits such as screwdriver bits. One conventional method of non-permanently attaching the deburring bit to the tool head is through the use of magnets. A magnet placed in an interior of the tool head attaches to a base of the deburring bit that is also magnetized. Alternatively, a conventional friction fit between the tool head and the deburring bit can be used as a method of non-permanently securing the deburring bit to the tool head. A latch within the interior of the tool head is one method of creating the pressure fit.

A person can deburr a machined component or part by angling the flexible shaft in such a manner that the deburring bit is positioned to interact with the burr of the part. The person then applies a rotational force to the handle that is transmitted to the deburring bit through the flexible shaft. The force applied to the burr by the deburring bit shears the burr off of the surface of the part.

It is an object of the present invention to provide a handheld tool to deburr components in hard to reach or tight fitting positions.

A further object of the invention is to provide a handheld tool that allows for the removal and replacement of the deburring bits.

A still further object of the invention is to provide a handheld tool that can support conventional screwdriver or hexagonal bits in addition to deburring bits.

An additional object of the invention is to provide a handheld tool that can position a deburring bit and deburr a part through the use of a flexible shaft.

Further objects and advantages of the invention will become apparent as the following description proceeds and the features of novelty which characterize this invention are pointed out with particularity in the claims annexed to and forming a part of this specification.

BRIEF DESCRIPTION OF THE DRAWINGS

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings wherein:

FIG. 1 is a perspective view of the flexible deburring tool;

FIG. 2 is a side view of the flexible deburring tool;

FIG. 3 is an end view of the flexible deburring tool showing the deburring bit;

FIG. 4 is an end view of the flexible deburring tool showing the handle; and

DESCRIPTION OF PREFERRED EMBODIMENTS

Figure 5:
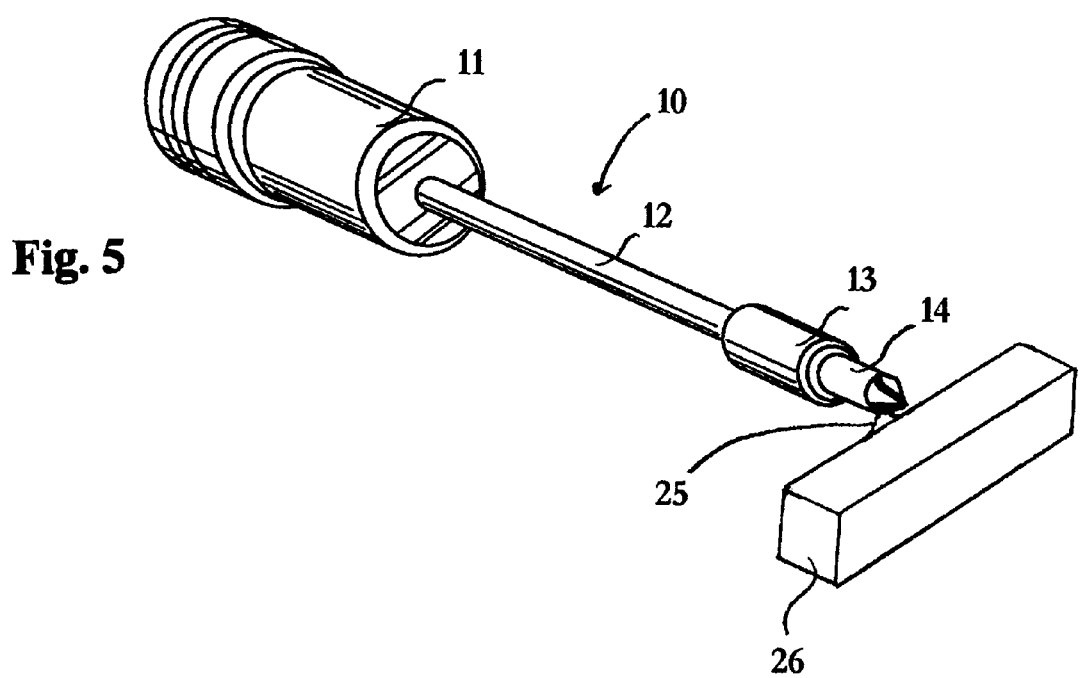
FIG. 5 is a perspective view showing the flexible deburring tool removing a burr.

Referring to the drawings by characters of reference, FIG. 1 discloses a perspective view of a flexible deburring tool 10. The flexible deburring tool 10 is useful for removing burrs from metal components. In a disclosed embodiment, the flexible deburring tool 10 is substantially of unitary construction. The flexible deburring tool 10 is predominantly made of plastic. The flexible deburring tool 10 is comprised of a plastic flexible tool support 21 and a deburring bit 14. The flexible tool support 21 is formed into a flexible shaft 12 having a gripping handle 11 at one end and a bit support 15 at an opposite end. The deburring bit 14 is supported by the bit support 15. The deburring bit 14 and the bit support 15 form a tool head 13.

PVC is a one material for the flexible tool support 21. DuPont Zytel ST Nylon is a preferred material for the flexible tool support 21. Nylon is flexible at room and low temperatures, waterproof, and unaffected by most chemicals. Nylon is an inexpensive material that can be formed through conventional injection molding manufacturing processes.

The flexible shaft 12 is narrower than the handle 11 and allows a range of flexation greater than 90 degrees. The flexible shaft 12 has a handle end 22 and a tool head end 23. In the preferred embodiment, the flexible shaft 12 is a solid pliable shaft of uniform composition 12. However, the flexible shaft 12 may also be a pliable hollow cylinder of uniform composition 12. The flexible shaft 12 is of uniform composition from being molded from a single continuous piece of plastic. In addition, the flexible shaft may be of laminate construction. Other conventional designs for the flexible shaft such as helical coils of wire may be used for the flexible shaft 12.

The tool head 13 is comprised of the metal deburring bit 14 and the bit support 15. The function of the tool head 13 is to remove the burrs from the components. The metal deburring bit 14 is rigidly secured to the plastic bit support 15 such that it cannot rotate relative to the flexible deburring tool 10. In addition, the deburring bit 14 is secured to the bit support 15 such that a portion 17 of the deburring bit 14 that engages the burrs is extending away from the bit support 15. The bit support 15 is formed at the tool head end 23 of the flexible shaft 12. As noted before, the bit support 15, handle 11, and flexible shaft 12 are all molded from one single piece of plastic.

In the tool head 13, the bit support 15 receives the deburring bit 14 within a bit recess 26. The bit recess 26 is formed within the bit support 15. The bit recess 26 is aligned along a longitudinal axis of the flexible deburring tool 10. It is critical that the deburring bit 14 be rotationally locked within bit recess 26. Having the deburring bit 14 rotationally locked within the bit recess 26 enables rotational force to be transferred from the flexible deburring tool 10 through the deburring bit 14 to the burr. The bit support 15 having the recess 26 has a sufficient wall thickness such that the deburring bit 14 does not cause the bit support 15 to deform under ordinary use.

There are several methods of securing the metal deburring bit 14 to the bit support 15. In one method, the deburring bit 14 is permanently secured to the bit support 15. The deburring bit 14 may be permanently secured to the bit support 15 through the use of adhesive bonding or a press fit. Alternatively, the deburring bit 14 may be attached to the bit support 15 such that the deburring bit 14 can be removed and replaced by another deburring bit 14 or other mechanical bit. One method of non-permanently securing the deburring bit 14 to the bit support 15 is through the use of magnets. A magnet 16 is secured within the bit recess 26. In this embodiment, the deburring bit 14 is provided with a magnetic base 19. The magnetic base 19 attaches the deburring bit 14 to the magnet 16 secured within the bit recess 26 when the magnet 16 is in contact with the base 19. Alternatively, a conventional friction fit between the bit support 15 and the deburring bit 14 can be used as a method of non-permanently securing the deburring bit 14 to the bit support 15. A latch within the recess 26 of the tool head 14 is one method of creating the friction fit.

In both of these embodiments that enable the deburring bit 14 to be interchanged, other mechanical bits such as hexagonal bits or screwdriver bits may be attached to the bit support 15. In addition, having the ability to non-destructively remove the deburring bit 14 from the bit support 15 allows for the replacement of the bit in use when it becomes dull and worn from numerous deburring processes. In addition, the ability to interchange bits enables a single handle 11, flexible shaft 12, and bit support 15 to support deburring bits 14 of various sizes and configurations. In all embodiments of this invention, the deburring bit 14 is secured to the bit support 15 such that it cannot rotate relative to the bit support 15.

The deburring bit 14 is provided with sharp ridges 17 that engage and remove burrs. Hard metals, such as tungsten carbide, titanium, or hardened steel, are a desirable material for the deburring bit 14 due to their high strength and durability. Alternatively, deburring bits made out of aluminum oxide that grind away the burrs may be used for the deburring bit 14.

A side view of the flexible deburring tool 10 is disclosed in FIG. 2. The deburring bit 14 protrudes from the tool head 13 to engage the burr of the component. The deburring bit 14 is aligned along a longitudinal axis 20 of the flexible deburring tool 10.

FIG. 3 discloses an end view of the flexible deburring tool 10 showing deburring bit 14. In this figure, the deburring bit 14 is a shaped metal bit having sharp ridges 17 that engage and remove the burrs. The sharp ridges 17 shear off the burrs when the deburring bit 14 is rotated relative to the burr in the direction such that the ridge 17 engages the burr.

An end view of the flexible deburring tool 10 showing the handle 11 is disclosed in FIG. 4 The handle 11 is sized to fit within a palm of a person's hand. The handle 11 may be molded such that it has a hollow interior. Note that the hollow interior is not large enough to reduce the rigidity of the handle 11 under normal operating conditions. Having the hollow interior enables the handle 11 to be constructed using less plastic than is required for a solid handle thereby reducing the cost of manufacture. It is conceived that various lettering or logos may be inscribed along the handle 11 with conventional etching processes to designate the manufacturer, product name, seller, or provide any other desirable message. A person will grasp the handle 11 to position the deburring bit 14 over the burr. FIG. 5 discloses a perspective view of the flexible deburring tool 10 removing the burr 25 from the component 26. To remove the burr, the person will rotate the handle 11 in the direction that places the ridges 17 in engagement with the burr 25.

The preferred embodiment of the flexible shaft 12 of the present invention, a solid pliable plastic shaft, is structurally different from the flexible shafts disclosed in the prior art. In addition, the alternative embodiment of the flexible shaft 12 of the present invention, a hollow pliable plastic shaft, is also structurally different from the flexible shaft designs taught by the prior art. Rentchler, U.S. Pat. No. 1,454,789, Hasemann et. al., U.S. Pat. No. 2,796,101, Kupfrian, U.S. Pat. No. 2,814,322, McGuire, U.S. Pat. No. 5,464,407, and Carr, U.S. Pat. No. 3,585,855, all teach the use of wire wound in helical coils for structure of the flexible shaft extending between the tool head and the handle. The structure of the helical metal coil flexible shaft is designed to support heavy torque loads. The solid and hollow plastic shafts used for the flexible shaft 12 of the present invention are not designed to support the heavy torque loads necessary to tighten mechanical joints. The structure of the flexible shaft 12 of the present invention is devoid of any metal helical coil. In addition, the flexible shaft 12 of the present invention has a uniform composition from being molded from a single piece of plastic. In contrast, the flexible cable, disclosed in these patents, have a non-uniform composition. The Hasemann et al., Kupfrian, McGuire, and Carr patents teach flexible cables that are comprised of successive layers of helical coils. The Rentchler patent teaches a flexible shaft that is comprised of a helical coil having a chain link cable running through the center of the helical coil.

The function of the helical metal coils is to transfer the heavy torque necessary to rotate and tighten a head of a screw, bolt, nut or the like from the handle to the tool head. The function of the solid and hollow plastic shafts used for the flexible shaft 12 are different from the function of the flexible shafts disclosed in the prior art. The function of the flexible shaft is to transfer the amount of torque necessary to remove the burr from the handle 11 to the tool head 13. The result achieved by the flexible shafts disclosed in the prior art is a tightened or loosened screw or bolt. The result achieved by the present invention is a removal of the burr.

The structure of the flexible arm disclosed in Nasiell, U.S Pat. No. 5,572,913, and Nasiel, U.S. Pat. No. 5,455,997, is also different from that of the flexible shaft 12 of the present invention. The flexible arm in these two patents is comprised of a flexible shaft that is housed within a hollow interior portion of a multi-segmented flexible arm. The multi-segmented arm is designed to be pre-deformed into a desired shape to enable the flexible tool to place the tool in difficult to reach positions. In contrast to the multiple components of the flexible shaft disclosed in these two patents, the flexible shaft 12 of the present invention is of unitary construction molded from a single piece of plastic.

In addition, the overall structure of the entire flexible deburring tool 10 of the present invention is different from the structure of the flexible tools disclosed in the prior art. The structure of the present invention that supports the deburring bit 14 is of unitary construction formed form a single piece of the plastic. This unitary structure is different from the multi-piece structures disclosed for flexible tools disclosed in the prior art. In Rentchler, U.S. Pat. No. 1,454,789, Donaldson, U.S. Pat. No. 1,507,990, Kupfrian, U.S. Pat. No. 2,814,322, Nasiell, U.S Pat. No. 5,572,913, and Nasiel, U.S. Pat. No. 5,455,997, and Carr, U.S. Pat. No. 3,585,855, the handle, flexible shaft, and tool head support are all separate components that must be rigidly secured to each other in an assembly process. The unitary construction of the present invention has the advantage over these multi-piece designs in that it requires fewer manufacturing processes to produce.

While these descriptions directly describe the above embodiments, it is understood that those skilled in the art may conceive modifications and/or variations to the specific embodiments shown and described herein. Any such modifications or variations that fall within the purview of this description are intended to be included therein as well. It is understood that the description herein is intended to be illustrative only and is not intended to be limitative. Rather, the scope of the invention described herein is limited only by the claims appended hereto.

What is claimed is:

1. A flexible deburring tool, comprising:
    A. a solid pliable shaft of uniform composition having a handle end and a tool head end;
    B. a gripping handle rigidly secured to the handle end of said flexible shaft;
    C. a bit support rigidly secured to the tool head end of said flexible shaft; and
    D. a deburring bit attached to said bit support, said deburring bit is rotationally locked to said bit support such that it cannot rotate along a longitudinal axis of said flexible deburring tool relative to said bit support.

2. The flexible deburring tool, as recited in claim 1, wherein said deburring bit is permanently secured to said bit support.

3. The flexible deburring tool, as recited in claim 1, wherein said deburring bit is non-permanently attached to said bit support, whereby said deburring bit can be non-destructively detached from said bit support.

4. A method for removing burrs from a metal component with a flexible deburring tool, comprising the steps of:
    A. bending a flexible shaft of said flexible deburring tool having a tool head, said tool head being secured to a tool head end of said flexible shaft;
    B. positioning a deburring bit over a burr, said deburring bit rigidly secured to said tool head, whereby said deburring bit mechanically engages said burr; and
    C. twisting a handle secured to a handle end of said flexible shaft, thereby rotating said deburring bit and removing said burr.

5. A flexible deburring tool, comprising:
    A. a hollow pliable cylinder of uniform composition having a handle end and a tool head end;
    B. a gripping handle rigidly secured to the handle end of said flexible shaft;

C. a bit support rigidly secured to the tool head end of said flexible shaft; and D. a deburring bit attached to said bit support, said deburring bit is rotationally locked to said bit support such that it cannot rotate along a longitudinal axis of said flexible deburring tool relative to said bit support.

6. The improvement, as recited in claim 5, wherein said deburring bit is permanently secured to said bit support.

7. The improvement, as recited in claim 5, wherein said deburring bit is removably attached to said to bit support whereby said deburring bit can be non-destructively removed from said bit support.

* * * * *